(12) United States Patent
Beisel (10) Patent No.: US 10,480,296 B2
(45) Date of Patent: Nov. 19, 2019

(54) CRITICAL VALVE PERFORMANCE MONITORING SYSTEM

(71) Applicant: Halliburton Energy Services, Inc., Houston, TX (US)

(72) Inventor: Joseph A. Beisel, Duncan, OK (US)

(73) Assignee: Halliburton Energy Services, Inc., Houston, TX (US)

(*) Notice: Subject to any disclaimer, the term of this patent is extended or adjusted under 35 U.S.C. 154(b) by 99 days.

(21) Appl. No.: 15/745,644

(22) PCT Filed: Sep. 4, 2015

(86) PCT No.: PCT/US2015/048647
§ 371 (c)(1),
(2) Date: Jan. 17, 2018

(87) PCT Pub. No.: WO2017/039698
PCT Pub. Date: Mar. 9, 2017

(65) Prior Publication Data
US 2018/0230786 A1    Aug. 16, 2018

(51) Int. Cl.
*F04B 47/02*  (2006.01)
*E21B 43/12*  (2006.01)
(Continued)

(52) U.S. Cl.
CPC .............. *E21B 43/12* (2013.01); *F04B 47/02* (2013.01); *F04B 49/065* (2013.01);
(Continued)

(58) Field of Classification Search
None
See application file for complete search history.

(56) References Cited

U.S. PATENT DOCUMENTS 3,921,435 A * 11/1975 Howard ............ F04B 49/10
                                                        374/5
4,705,459 A    11/1987 Buisine et al.
(Continued)

FOREIGN PATENT DOCUMENTS

CA        2992014       3/2017
WO    2011095935       8/2011
(Continued)

OTHER PUBLICATIONS

Canadian Patent Application No. 2,992,013, Office Action dated Oct. 4, 2018, 5 pages.
(Continued)

*Primary Examiner* — Thomas C Lee
*Assistant Examiner* — Gary Collins
(74) *Attorney, Agent, or Firm* — Kilpatrick Townsend & Stockton LLP (57) ABSTRACT

A monitoring system may include a position sensor, strain gauges, and a computing device for monitoring valves in a pressure pump having multiple chambers to determine critical valve limits for the valves using strain measurements for each charmber. The strain gauges may determine strain in each chamber of the pressure pump. The position sensor may determine the position of a crankshaft mechanically coupled to a plunger in each chamber. The computing device may receive signals generated by the strain gauges and the position sensor related to the strain in each chamber and the position of the crankshaft, respectively, and may process the signals to determine delays in the actuation of the valves for determining critical valve limits.

20 Claims, 7 Drawing Sheets

(51) Int. Cl.
*F04B 49/06* (2006.01)
*G01B 7/00* (2006.01)

(52) U.S. Cl.
CPC ............ *F04B 2201/0201* (2013.01); *F04B 2201/0603* (2013.01); *F04B 2201/1208* (2013.01); *G01B 7/003* (2013.01)

(56) References Cited

U.S. PATENT DOCUMENTS

| | | | |
|---|---|---|---|
| 5,846,056 A | 12/1998 | Dhindsa et al. | |
| 6,155,347 A | 12/2000 | Mills | |
| 6,882,960 B2 | 4/2005 | Miller et al. | |
| 7,043,975 B2* | 5/2006 | Du | F15B 19/005 |
| | | | 73/168 |
| 7,623,986 B2 | 11/2009 | Miller et al. | |
| 8,807,960 B2 | 8/2014 | Stephenson et al. | |
| 9,759,213 B2* | 9/2017 | Bassett | F04B 51/00 |
| 2002/0176784 A1* | 11/2002 | Du | F04B 1/324 |
| | | | 417/53 |
| 2004/0018100 A1* | 1/2004 | Takagi | F04B 43/046 |
| | | | 417/322 |
| 2004/0158419 A1* | 8/2004 | Pearson | G05B 23/0235 |
| | | | 702/64 |
| 2005/0180868 A1 | 8/2005 | Miller | |
| 2006/0037408 A1* | 2/2006 | Peter | G01F 1/363 |
| | | | 73/861.63 |
| 2007/0140869 A1* | 6/2007 | St. Michel | E21B 47/0008 |
| | | | 417/53 |
| 2008/0260558 A1* | 10/2008 | Luongo | F04B 53/16 |
| | | | 417/437 |
| 2009/0041588 A1 | 2/2009 | Hunter et al. | |
| 2009/0129935 A1 | 5/2009 | Kunkler et al. | |
| 2009/0317262 A1 | 12/2009 | Gilpatrick | |
| 2011/0046903 A1* | 2/2011 | Franklin | G01M 3/2815 |
| | | | 702/51 |
| 2013/0151216 A1 | 6/2013 | Palka et al. | |
| 2013/0261993 A1* | 10/2013 | Ruchti | G01F 1/74 |
| | | | 702/50 |
| 2014/0096957 A1 | 4/2014 | Van Zuilekom et al. | |
| 2014/0288858 A1* | 9/2014 | Franklin | G01M 3/2815 |
| | | | 702/51 |
| 2015/0027693 A1 | 1/2015 | Edwards et al. | |

FOREIGN PATENT DOCUMENTS

| | | |
|---|---|---|
| WO | 2017039692 | 3/2017 |
| WO | 2017039695 | 3/2017 |
| WO | 2017039700 | 3/2017 |
| WO | 2017039701 | 3/2017 |

OTHER PUBLICATIONS

International Patent Application No. PCT/US2015/048588, "International Search Report and Written Opinion", dated May 4, 2016, 8 pages.
International Patent Application No. PCT/US2015/048610, "International Search Report and Written Opinion", dated May 4, 2016, 9 pages.
International Patent Application No. PCT/US2015/048647, "International Search Report and Written Opinion", dated May 4, 2016, 8 pages.
International Patent Application No. PCT/US2015/048673, "International Search Report and Written Opinion", dated Jun. 3, 2016, 15 pages.
International Patent Application No. PCT/US2015/048696, "International Search Report and Written Opinion", dated May 4, 2016, 8 pages.

* cited by examiner

CRITICAL VALVE PERFORMANCE MONITORING SYSTEM

TECHNICAL FIELD

The present disclosure relates generally to pressure pumps for a wellbore and, more particularly (although not necessarily exclusively), to determining critical performance limits for valves in a multi-chamber pressure pump.

BACKGROUND

Pressure pumps may be used in wellbore treatments. For example, hydraulic fracturing (also known as "fracking" or "hydro-fracking") may utilize a pressure pump to introduce or inject fluid at high pressures into a wellbore to create cracks or fractures in downhole rock formations. Due to the high-pressured and high-stressed nature of the pumping environment, pressure pump parts may undergo mechanical wear and require frequent replacement. The frequent change of parts may result in additional costs for the replacement parts and additional time due to the delays in operation while the replacement parts are installed.

DETAILED DESCRIPTION

Certain aspects and examples of the present disclosure relate to a monitoring system for determining critical valve limits for valves in a pressure pump by monitoring and comparing the actuation of the valves using strain measurements. The pressure pump may be in fluid communication with an environment of a wellbore. The pressure pump may include multiple chambers on a fluid end of the pressure pump for receiving and discharging fluid for injecting the fluid into the wellbore. The critical valve limits may correspond to a normal or expected range of operations for the valves in the pressure pumps. The monitoring system may determine a critical valve limit for each valve in the pressure pump. The critical valve limit may be determined by comparing valves of similar type and operation across each chamber of the pressure pump (e.g., comparing a suction valve in a chamber with suction valves in other chambers, comparing a discharge valve in a chamber with discharge valves in other chambers). Each chamber may include a suction valve that may be actuated to open and close to allow fluid to enter the chamber in response to the movement of a plunger in the chamber. Each chamber may also include a discharge valve in the chamber that may be actuated to open and close to allow fluid to exit the chamber in response to the movement of the plunger. The plunger in each chamber of the pressure pump may be mechanically coupled to a single crankshaft causing the plungers to operate in concert in their respective chambers. As fluid is received and discharged from the chambers, strain in the fluid end fluctuates. A monitoring system may determine strain in each chamber of the pressure pump based on strain signals. The strain signals may be generated by strain gauges coupled to the fluid end of the pump and may represent strain each of the chambers. In some aspects, the monitoring system may determine actuation points representing the actuation (e.g., the opening and closing) of the suction valve and discharge valves in each chamber based on discontinuities in the strain signal corresponding to the chamber in which the valves are located.

A monitoring system according to some aspects may also determine a position of the plunger in each chamber at the time of actuation of the valves in each chamber by cross-referencing the actuation points of the valves with a position signal generated by a position sensor coupled to the power end of the pressure pump and representing the position of a crankshaft mechanically coupled to the plungers. The monitoring system may correlate the actuation points with the position of the plunger to determine actuation angles corresponding to delays in the actuation of the valves in each. In some aspects, the actuation delay of the valves may correspond to a condition of the chamber in which the valves are located. The actuation delay of each valve may be compared to valves of a similar type or operation (e.g., suction valves, discharge valves) for a same actuation type (e.g., opening, closing) in the other chambers of the pressure pump to determine a critical valve limit for the valves.

The critical valve limit may correspond to an expected range of operation for the valve. For example, the critical valve limit for an opening of a suction valve in a first chamber of the pressure pump may be determined by comparing the actuation delays for an opening of the suction valves in each chamber of the pressure pump. Similarly, the critical valve limit for an opening of a discharge valve in the first chamber of the pressure pump may be determined by comparing the actuation delays for an opening of the discharge valves in each chamber of the pressure pump. An outlier valve falling outside of the critical valve limit may indicate a condition or issue in the chamber of the valve or a condition of the valve itself. In some aspects, the monitoring system may be programmable to determine all possible valve-timing conditions and may diagnose the performance of the pressure pump (e.g., a condition in the chamber) based on the comparison of the actuation delays. For example, the diagnosis may indicate a leak in the valve (e.g., represented by a delayed sealing), a failed valve (represented by no load up in the chamber of the pressure pump), or another condition of the pressure pump determinable from the valve-timing conditions.

In some aspects, a pressure pump without a monitoring system according to the present disclosure may require additional pump data that may be difficult to obtain to accurately determine ranges of normal operation for the valves. The pump data may include fluid system properties, pump properties (e.g., the effective modulus of the pressure pump, packing, valve inserts, etc.), and operations information (e.g., discharge pressure, discharge rate, etc.). Data such as the fluid system properties may be subject to significant changes during the course of a pumping operation using the pressure pump and, thus, would require frequent verifications to consistently provide protection to critical pump components. Further, calibration runs may be necessary to characterize the pressure pump and a database would be needed to maintain performance data of the pressure pump across different pressures and rates. Determining the critical valve limits based on a comparison of the valves may allow for savings of cost and labor in the information gathering and calculations otherwise necessary to determine expected ranges for the operation of the valves. Since the fluid system properties, pump properties, and operations information may similarly affect actuations of similarly operating valves, the monitoring system, according to some aspects, may reliably determine the critical valve limits by comparing the similarly operating valves during operation of the pressure pump.

A monitoring system according to some aspects may also allow the condition of the valves in the pressure pump to be determined without breaching the external surface of the pressure pump. For example, a strain gauge may be positioned on the external surface of the fluid end of the pressure pump and a position sensor may be positioned on an external surface of the power end of the pressure pump to measure and generate signals corresponding to the strain in a chamber and the position of the crankshaft, respectively. In this manner, an additional stress concentration is not added to the pressure pump in the form of a hole or other breach of the pressure pump to access an interior of the fluid end. Eliminating or not including additional stress concentration caused by a breach of the pressure pump may extend the fatigue life of the pressure pump. Further, a monitoring system may determine the performance of the pressure pump using strain measurements, as opposed to pressure or other measurements for determining the internal conditions of the pressure pump chamber to allow for relaxed requirements in the accuracy of the strain gauge. Based on the ability of the strain gauge to characterize the loading and unloading of the strain in the signal (even without knowing the precise amount of pressure in the chamber), the monitoring system may be able to accurately determine the actuation of the valves in the pressure pump.

Still further, a monitoring system according to some aspects may also protect components of the pressure valve from over damage due to jetting, erosion, improper lubrication of journal or semi journal bearings, etc. The monitoring system may monitor the valves throughout the operation of the pressure pump to allow valve maintenance to be performed on an as-needed basis, rather than scheduled by a predetermined number of stages. The reduced downtime caused by prescheduled and unnecessary maintenance may lead to cost savings in the number of valves used and replaced as well as in the time and labor saved in performing pump maintenance.

Figure 1A:
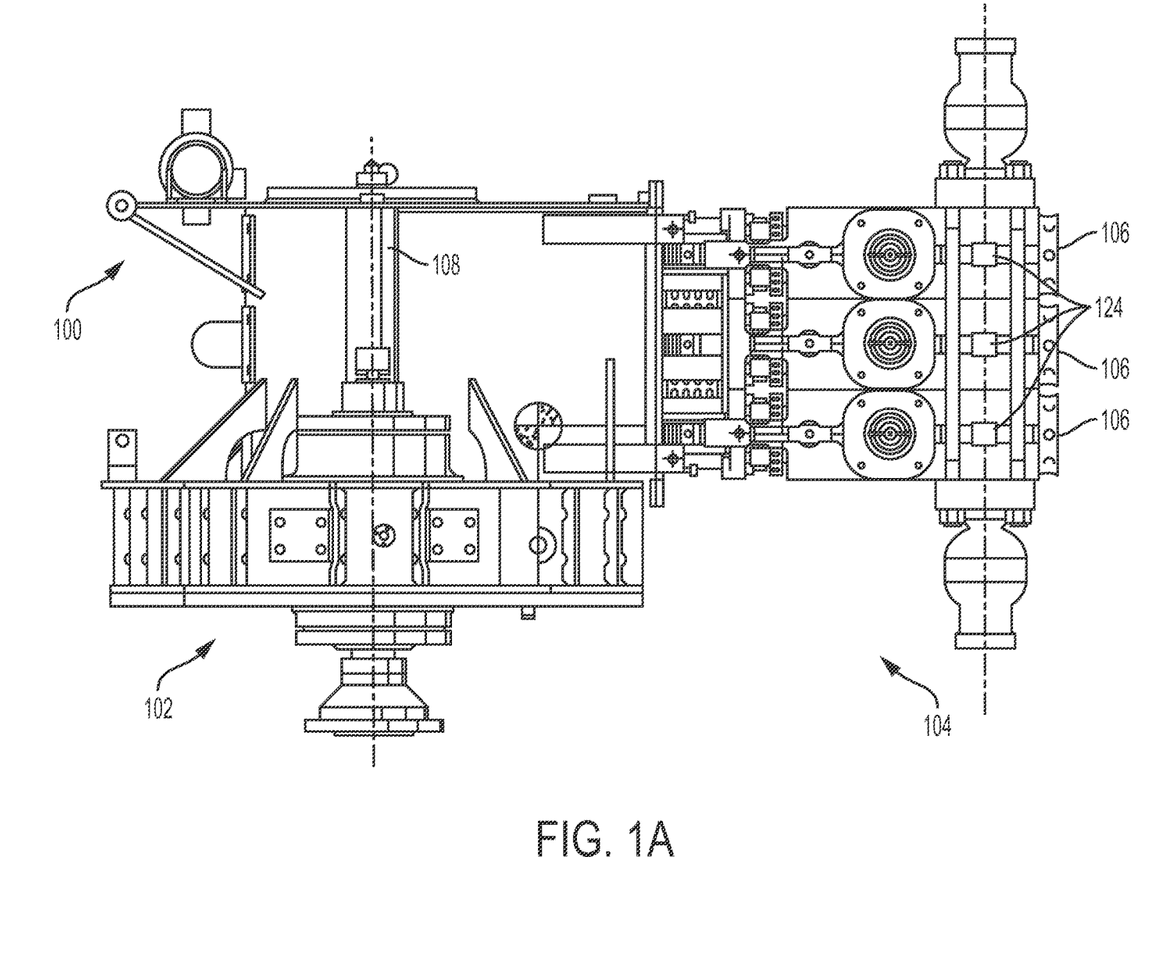
FIG. 1A is a cross-sectional, top view schematic diagram depicting an example of a pressure pump that may include a monitoring system according to one aspect of the present disclosure.
Figure 1B:
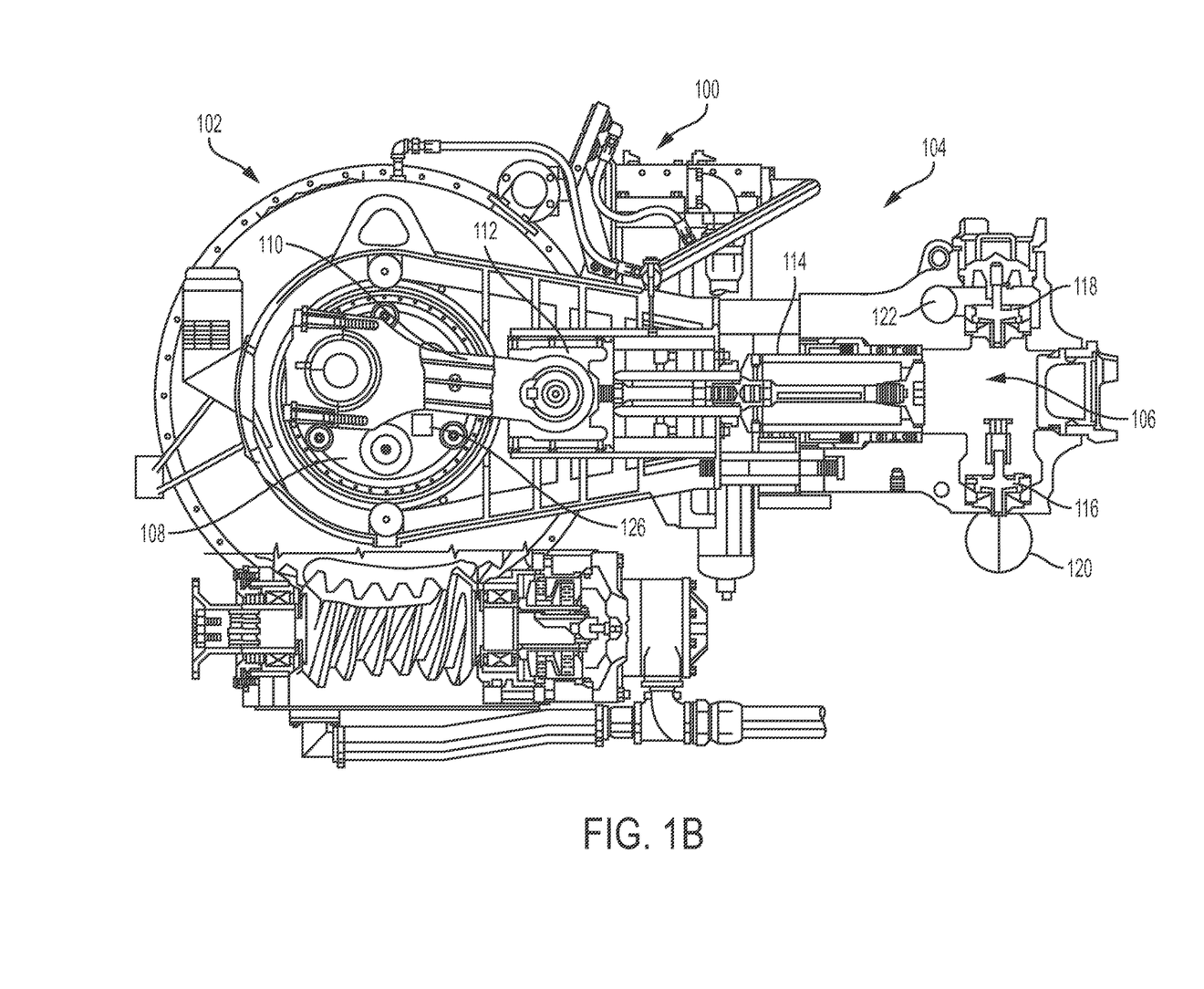
FIG. 1B is a cross-sectional, side view schematic diagram depicting the pressure pump of FIG. 1A according to one aspect of the present disclosure.

FIGS. 1A and 1B show a pressure pump 100 that may utilize a monitoring system according to some aspects of the present disclosure. The pressure pump 100 may be any positive displacement pressure pump. The pressure pump 100 may include a power end 102 and a fluid end 104. The power end 102 may be coupled to a motor, engine, or other prime mover for operation. The fluid end 104 includes three chambers 106 for receiving and discharging fluid flowing through the pressure pump 100. Although FIG. 1A shows three chambers 106 in the pressure pump 100, the pressure pump 100 may include additional chambers 106 without departing from the scope of the present disclosure.

The pressure pump 100 may also include a rotating assembly. The rotating assembly may include a crankshaft 108, one or more connecting rods 110, a crosshead 112, plungers 114, and related elements (e.g., pony rods, clamps, etc). The crankshaft 108 may be positioned on the power end 102 of the pressure pump 100 and may be mechanically connected to a plunger 114 in a chamber 106 of the pressure pump via the connecting rod 110 and the crosshead 112. The power end 102 may include an external casing or crankcase. The crankshaft 108 may cause plungers 114 located in each chamber 106 to displace any fluid in the chambers 106. Each chamber 106 of the pressure pump 100 may include a separate plunger 114, each plunger 114 in each chamber 106 mechanically connected to the crankshaft 108 via the connecting rod 110 and the crosshead 112. Each chamber 106 may include a suction valve 116 and a discharge valve 118 for absorbing fluid into the chamber 106 and discharging fluid from the chamber 106, respectively. The fluid may be absorbed into and discharged from the chamber 106 in response to a movement of the plunger 114 in the corresponding chamber 106. Based on the mechanical coupling of the crankshaft 108 to the plunger 114 in the chamber 106, the movement of the plunger 114 in each chamber 106 may be directly related to the movement of the crankshaft 108.

A suction valve 116 and a discharge valve 118 may be included in each chamber 106 of the pressure pump 100. In some aspects, the suction valve 116 and the discharge valve 118 may be passive valves. As the plunger 114 operates in each chamber 106, the plunger 114 may impart motion and pressure to the fluid in the chamber 106 by direct displacement. The suction valve 116 and the discharge valve 118 in each chamber 106 may open or close based on the displacement of the fluid in the chamber 106 by the operation of the plunger 114. For example, the suction valve 116 may be opened during a recession of the plunger 114 to provide absorption of fluid from outside of the chamber 106 into the chamber 106. As the plunger 114 is withdrawn from the chamber 106, a partial suction may be created to open the suction valve 116 to allow fluid to enter the chamber 106. In some aspects, the fluid may be absorbed into each chamber 106 from a corresponding inlet manifold 120. Fluid already in each chamber 106 may move to fill the space where the plunger 114 was located in the chamber 106. The discharge valve 118 may be closed during this process.

The discharge valve 118 may be opened as the plunger 114 moves forward (or reenters) the chamber 106. As the plunger 114 moves further into the chamber 106, the fluid may be pressurized. The suction valve 116 may be closed during this time to allow the pressure on the fluid to force the discharge valve 118 to open and discharge fluid from the chamber 106. In some aspects, the discharge valve 118 in each chamber 106 may discharge the fluid into a corresponding discharge manifold 122. The loss of pressure inside the chamber 106 may allow the discharge valve 118 to close and the cycle may restart. Together, the suction valves 116 and the discharge valves 118 in each chamber 106 may operate to provide the fluid flow of the pressure pump 100 in a desired direction. The pump process may include a measurable amount of pressure and stress in each chamber 106, the stress resulting in strain to the chamber 106 or fluid end 104 of the pressure pump 100. In some aspects, the monitoring system may be coupled to the pressure pump 100 to gauge the strain and determine actuation of the suction valve 116 and the discharge valve 118 in the chamber 106.

In some aspects, a monitoring system according to some aspects of the present disclosure may be coupled to the pressure pump 100 to gauge the strain and determine actuation of the suction valve 116 and the discharge valve 118 in the chamber 106. For example, a monitoring system may include strain gauges positioned on an external surface of the fluid end 104 to gauge strain in the chambers 106. Blocks 124 in FIG. 1A show an example placement for the strain gauges that may be included in the monitoring system. In some aspects, the monitoring system may include a separate strain gauge to monitor strain in each chamber 106 of the pressure pump 100. In some aspects, a monitoring system according to some aspects may also include one or more position sensors for sensing the position of the crankshaft 108. Measurements of the crankshaft position may allow the monitoring system to determine the position of the plungers 114 in the respective chambers 106. A position sensor of the monitoring system may be positioned on an external surface of the pressure pump 100. Block 126 shows an example placement of a position sensor on an external surface of the power end 102 to sense the position of the crankshaft 108. In some aspects, measurements from the position sensor may be correlated with the measurements from the strain gauges to determine actuation delays corresponding to the valves 116, 118 in each chamber 106 of the pressure pump 100 for identifying cavitation in the fluid end 104.

Figure 2:
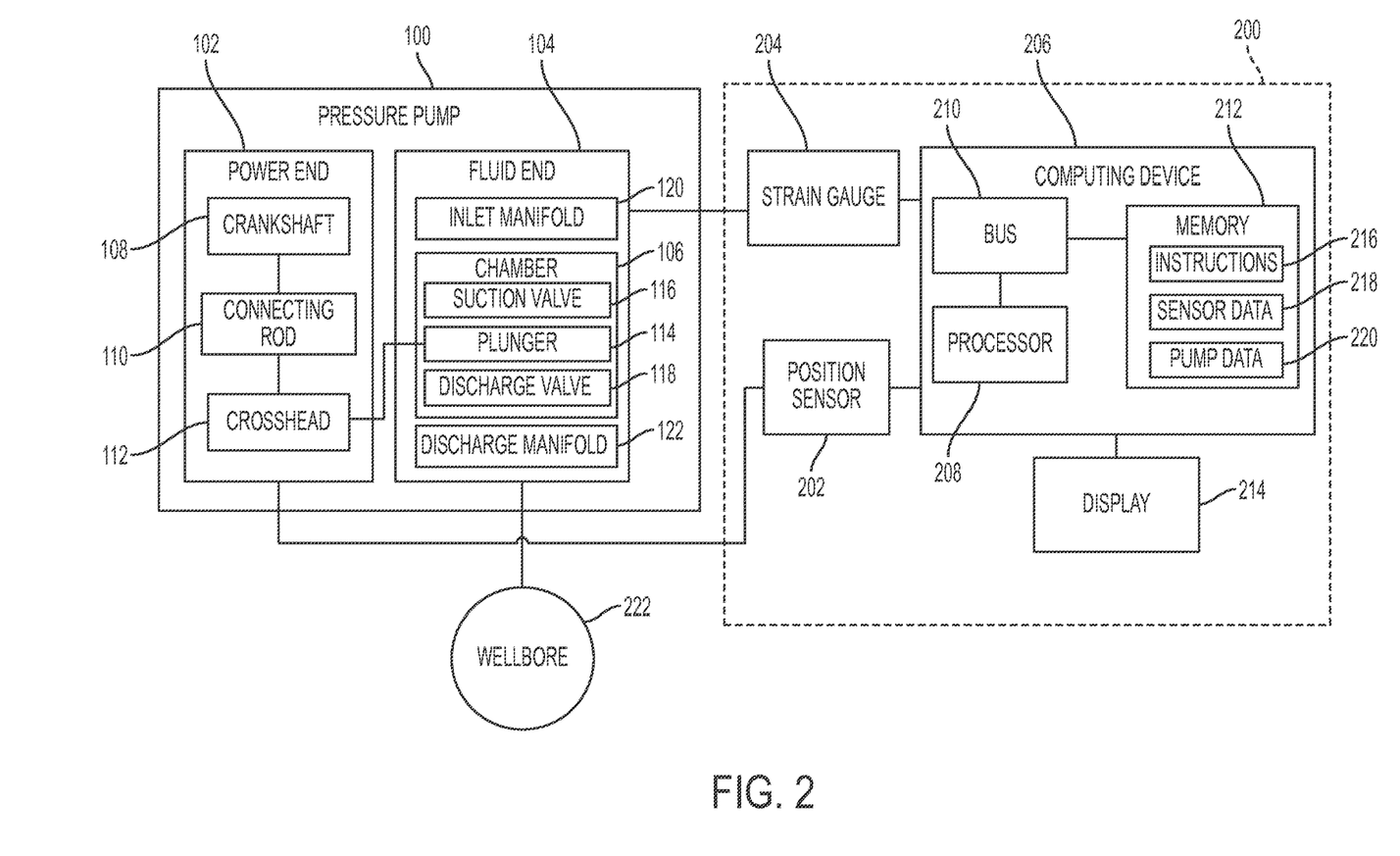
FIG. 2 is a block diagram depicting a monitoring system for a pressure pump according to one aspect of the present disclosure.

FIG. 2 is a simple block diagram showing an example of a monitoring system 200 coupled to the pressure pump 100. The monitoring system 200 may include a position sensor 202, strain gauges 204, and a computing device 206. The position sensor 202 and the strain gauges 204 may be coupled to the pressure pump 100. The position sensor 202 may include a single sensor or may represent an array of sensors. The position sensor 202 may be a magnetic pickup sensor capable of detecting ferrous metals in close proximity. The position sensor 202 may be positioned on the power end 102 of the pressure pump 100 for determining the position of the crankshaft 108. In some aspects, the position sensor 202 may be placed proximate to a path of the crosshead 112. The path of the crosshead 112 may be directly related to a rotation of the crankshaft 108. The position sensor 202 may sense the position of the crankshaft 108 based on the movement of the crosshead 112. In other aspects, the position sensor 202 may be placed on a crankcase of the power end 102 as illustrated by block 126 in FIG. 1A. The position sensor 202 may determine a position of the crankshaft 108 by detecting a bolt pattern of the position sensor 202 as it rotates during operation of the pressure pump 100. In each aspect, the position sensor 202 may generate a signal representing the position of the crankshaft 108 and transmit the signal to the computing device 206.

The strain gauges 204 may be positioned on the fluid end 104 of the pressure pump 100. The strain gauge 204 may include three or more gauges for determining strain in each chamber 106 of the pressure pump 100. The monitoring system 200 may include a strain gauge 204 for each chamber 106 of the pressure pump 100 to determine strain in each of the chambers 106, respectively. In some aspects, the strain gauges 204 may be positioned on an external surface of the fluid end 104 of the pressure pump 100 in a position subject to strain in response to stress in the corresponding chamber 106. For example, each of the strain gauges 204 may be positioned on a section of the fluid end 104 in a manner such that when the chamber 106 corresponding to each strain gauge 204 loads up, strain may be present at the location of the strain gauge 204. Placement of the strain gauges 204 may be determined based on engineering estimations, finite element analysis, or by some other analysis. For example, finite element analysis may determine that strain in a chamber 106 may be directly over a plunger bore of that chamber 106 during load up. One of the strain gauge 204 may be placed on an external surface of the pressure pump 100 in a location directly over the plunger bore corresponding to the chamber 106 as illustrated by blocks 124 in FIG. 1A to measure strain in the chamber 106. The strain gauge 204 may generate a signal representing strain in the chamber 106 and transmit the signal to the computing device 206.

The computing device 206 may be coupled to the position sensor 202 and the strain gauge 204 to receive the generated signals from the position sensor 202 and the strain gauge 204. The computing device 206 may include a processor 208, a bus 210, and a memory 212. In some aspects, the monitoring system 200 may also include a display unit 214. The processor 208 may execute instructions 216 including one or more operation for determining the condition of the valves 116, 118 of the pressure pump 100. The instructions 216 may be stored in the memory 212 coupled to the processor 208 by the bus 210 to allow the processor 208 to perform the operations. The processor 208 may include one processing device or multiple processing devices. Non-limiting examples of the processor 208 may include a Field-Programmable Gate Array ("FPGA"), an application-specific integrated circuit ("ASIC"), a microprocessor, etc.

The non-volatile memory 212 may include any type of memory device that retains stored information when powered off. Non-limiting examples of the memory 212 may include electrically erasable and programmable read-only memory ("EEPROM"), a flash memory, or any other type of non-volatile memory. In some examples, at least some of the memory 212 may include a medium from which the processor 208 can read the instructions 216. A computer-readable medium may include electronic, optical, magnetic or other storage devices capable of providing the processor 208 with computer-readable instructions or other program code (e.g., instructions 216). Non-limiting examples of a computer-readable medium include (but are not limited to) magnetic disks(s), memory chip(s), ROM, random-access memory ("RAM"), an ASIC, a configured processor, optical storage, or any other medium from which a computer processor can read the instructions 216. The instructions 216 may include processor-specific instructions generated by a compiler or an interpreter from code written in any suitable computer-programming language, including, for example, C, C++, C#, etc.

In some examples, the computing device 206 may determine an input for the instructions 216 based on sensor data 218 from the position sensor 202 or the strain gauges 204, data input into the computing device 206 by an operator, or other input means. For example, the position sensor 202 or the strain gauges 204 may measure a parameter associated with the pressure pump 100 (e.g., the position of the crankshaft 108, strain in the chamber 106) and transmit associated signals to the computing device 206. The computing device 206 may receive the signals, extract data from the signals, and store the sensor data 218 in memory 212. In additional aspects, the computing device 206 may determine an input for the instruction 216 based on pump data 220 stored in the memory 212 in response to previous determinations by the computing device 206. For example, the processor 208 may execute instructions 216 for determining the critical valve limit for the valves 116, 118 in the pressure pump 100 and may store the results as pump data 220 in the memory 212 for use in further pressure pump 100 and monitoring system 200 operations (e.g., calibrating the pressure pump 100, determining conditions in one or more chambers 106 of the pressure pump 100, etc.).

In some aspects, the computing device 206 may generate interfaces associated with the sensor data 218 or pump data 220, and information generated by the processor 208 therefrom, to be displayed via a display unit 214. The display unit 214 may be coupled to the processor 208 and may include any CRT, LCD, OLED, or other device for displaying interfaces generated by the processor 208. In some aspects, the computing device 206 may also generate an alert or other communication of the performance of the pressure pump 100 based on determinations by the computing device 106 in addition to the graphical interfaces. For example, the display unit 214 may include audio components to emit an audible signal when an ill condition is present in the pressure pump 100.

In some aspects, in addition to the monitoring system 200, the pressure pump 100 may also be coupled to a wellbore 222. For example, the pressure pump 100 may be used in hydraulic fracturing to inject fluid into the wellbore 222. Subsequent to the fluid passing through the chambers 106 of the pressure pump 100, the fluid may be injected into the wellbore 222 at a high pressure to break apart or otherwise fracture rocks and other formations adjacent to the wellbore 222 to stimulate a production of hydrocarbons. The monitoring system 200 may monitor the suction valves 116 and the discharge valves 118 to determine when to halt the fracturing process for maintenance of the pressure pump 100. Although hydraulic fracturing is described here, the pressure pump 100 may be used for any process or environment requiring a positive displacement pressure pump.

Figure 3:
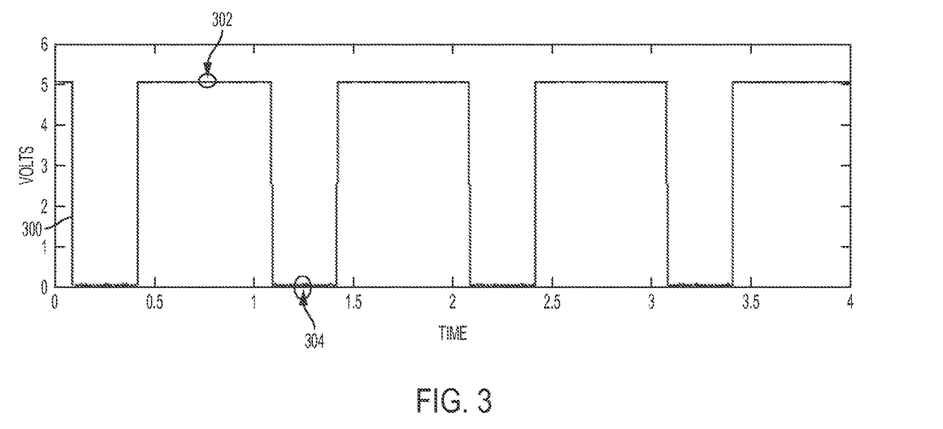
FIG. 3 is a signal graph depicting a signal generated by a position sensor of the monitoring system of FIG. 2 according to one aspect of the present disclosure.
Figure 4:
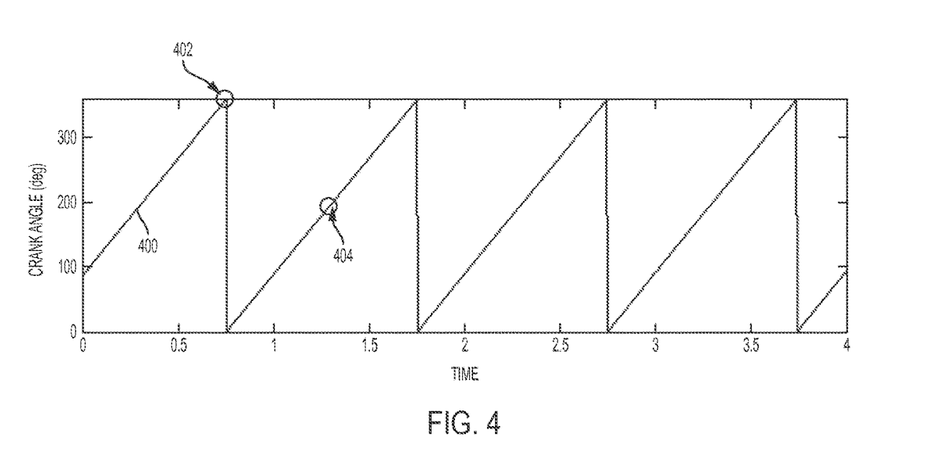
FIG. 4 is a signal graph depicting an alternative signal generated by a position sensor of the monitoring system of FIG. 2 according to one aspect of the present disclosure.

FIGS. 3 and 4 show position signals 300, 400 generated by the position sensor 202 during operation of the crankshaft 108. In some aspects, the position signals 300, 400 may be shown on the display unit 214 in response to generation of graphical representation of the position signals 300, 400 by the computing device 206. FIG. 3 shows a position signal 300 displayed in volts over time (in seconds). The position signal 300 may be generated by the position sensor 202 coupled to the power end 102 of the pressure pump 100 and positioned in a path of the crosshead 112. The position signal 300 may represent the position of the crankshaft 108 over the indicated time as the crankshaft 108 operates to cause the plungers 114 to move in their respective chambers 106. The mechanical coupling of the plungers 114 to the crankshaft 108 may allow the computing device 206 to determine a position of the plungers 114 relative to the position of the crankshaft 108 based on the position signal 300. In some aspects, the computing device 206 may determine plunger position reference points 302, 304, 402, 404 based on the position signal 300 generated by the position sensor 202. For example, the processor 208 may determine dead center positions of the plungers 114 based on the position signal 300. The dead center positions may include the position of each plunger 114 in which it is farthest from the crankshaft 108, known as the top dead center. The dead center positions may also include the position of each plunger 114 in which it is nearest to the crankshaft 108, known as the bottom dead center. The distance between the top dead center and the bottom dead center may represent the length of a full stroke of the plungers 114 operating in each chamber 106.

In FIG. 3, the top dead center is represented by reference point 302 and the bottom dead center is represented by reference point 304. In some aspects, the processor 208 may determine the reference points 302, 304 by correlating the position signal 300 with a known ratio or other value representing the relationship between the movement of the crankshaft 108 and the movement of the plungers 114 (e.g., the mechanical correlations of the crankshaft 108 to the plungers 114 based on the mechanical coupling of the crankshaft 108 to the plungers 114). The computing device 206 may determine the top dead center and bottom dead center based on the position signal 300 or may determine other plunger position reference points to determine the position of the plunger in each chamber 106 over the operation time of the pressure pump 100.

FIG. 4 shows a position signal 400 displayed in degrees over time (in seconds). The degree value may represent the angle of the crankshaft 108 during operation of the crankshaft 108 or pressure pump 100. In some aspects, the position signal 400 may be generated by the position sensor 202 located on a crankcase of the crankshaft 108. The position sensor 202 may generate the position signal 400 based on a bolt pattern of the position sensor 202 as it rotates in response to the rotation of the crankshaft 108 during operation. Similar to the position signal 300 shown in FIG. 3, the computing device 206 may determine plunger position reference points 302, 304, 402, 404 based on the position signal 400. The reference points 402, 404 in FIG. 4 represent the top dead center and bottom dead center of the plungers 114 during operation of the pressure pump 100.

Figure 5:
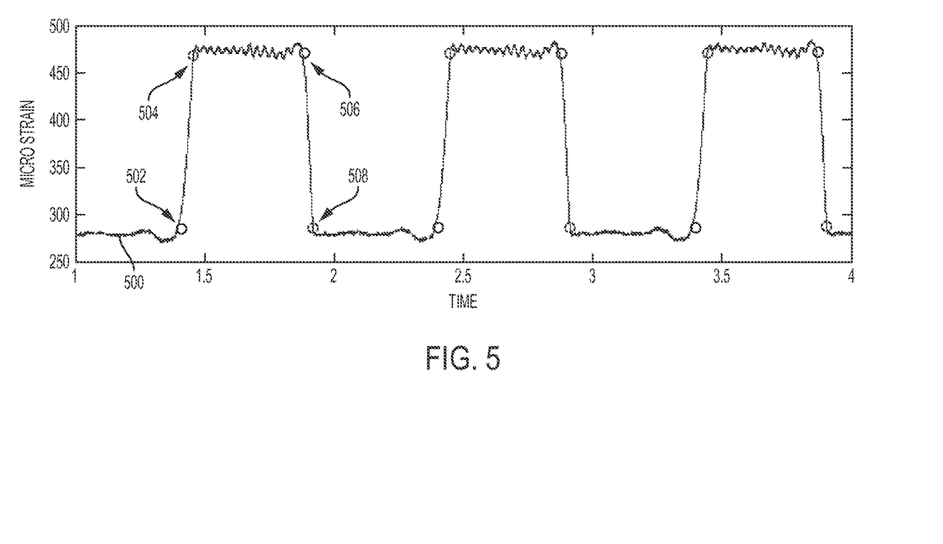
FIG. 5 is a signal graph depicting a signal generated by a strain gauge of the monitoring system of FIG. 2 according to one aspect of the present disclosure.

FIG. 5 shows a raw strain signal 500 generated by the strain gauge 204 coupled to the fluid end 104 of the pressure pump 100 and positioned on an external surface of the fluid end 104. The strain signal 500 may represent strain measured by the strain gauge 204 in a chamber 106 of the pressure pump 100. A monitoring system 200 may include a strain gauge 204 for each chamber 106 of the pressure pump 100. Each strain gauge 204 may generate a strain signal 500 corresponding to the chamber 106 for which it is measuring strain. The computing device 206 may determine the actuation points 502, 504, 506, 508 of the suction valve 116 and the discharge valve 118 for each chamber 106 based on the strain signal 500 for each chamber 106. The actuation points 502, 504, 506, 508 may represent the point in time where the suction valves 116 and the discharge valves 118 in each of the chambers 106 open and close.

The computing device 206 may execute the instructions 216 stored in the memory 212 and including signal-processing algorithms to determine the actuation points 502, 504, 506, 508. For example, the computing device 206 may execute instruction 216 to determine the actuation points 502, 504, 506, 508 by determining discontinuities in the strain signal 500 of each chamber 106. The stress in the chambers 106 may change during the operation of the suction valves 116 and the discharge valves 118 to cause the discontinuities in the strain signal 500 for each chamber 106 during actuation of the valves 116, 118 in each chamber 106. The computing device 206 may identify the discontinuities as the opening and closing of the valves 116, 118 in each chamber 106. In one example, the strain in a chamber 106 may be isolated to the fluid in the chamber 106 when the suction valve 116 is closed. The isolation of the strain may cause the strain in the chamber 106 to load up until the discharge valve 118 is opened. When the discharge valve 118 is opened, the strain may level until the discharge valve 118 is closed, at which point the strain may unload until the suction valve 116 is reopened. The discontinuities may be present when the strain signal 500 shows a sudden increase or decrease in value corresponding to the actuation of the valves 116, 118.

In FIG. 5, actuation point 502 represents a suction valve 116 closing, actuation point 504 represents a discharge valve 118 opening, actuation point 506 represents a discharge valve 118 closing, and actuation point 508 represents a suction valve 116 opening to resume the cycle of fluid into and out of the chamber 106 in which the valves 116, 118 are located. In some aspects, the computing device 206 may cause the display unit 214 to display the strain signal 500 and the actuation points 502, 504, 506, 508 as shown in FIG. 5 for each chamber 106 of the pressure pump 100. The exact magnitudes of strain in each chamber 106 determined by the corresponding strain gauge 204 may not be required for determining the actuation points 502, 504, 506, 508 for the valves 116, 118 in each chamber 106. The computing device 206 may determine the actuation points 502, 504, 506, 508 based on the strain signal 500 corresponding to each chamber 106 providing a characterization of the loading and unloading of the strain in respective chamber 106. In some aspects, the actuation points 502, 504, 506, 508 may be cross-referenced with the position signals 300, 400 to determine an actual position of the plunger 114 at the time of valve actuation.

Figure 6:
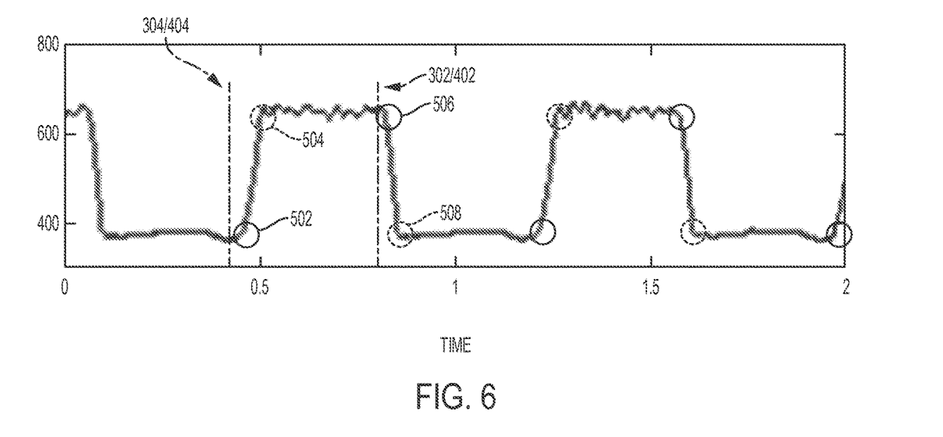
FIG. 6 is a signal graph depicting actuation of a suction valve and a discharge valve relative to the strain signal of FIG. 5 and a plunger position according to one aspect of the present disclosure.
Figure 7:
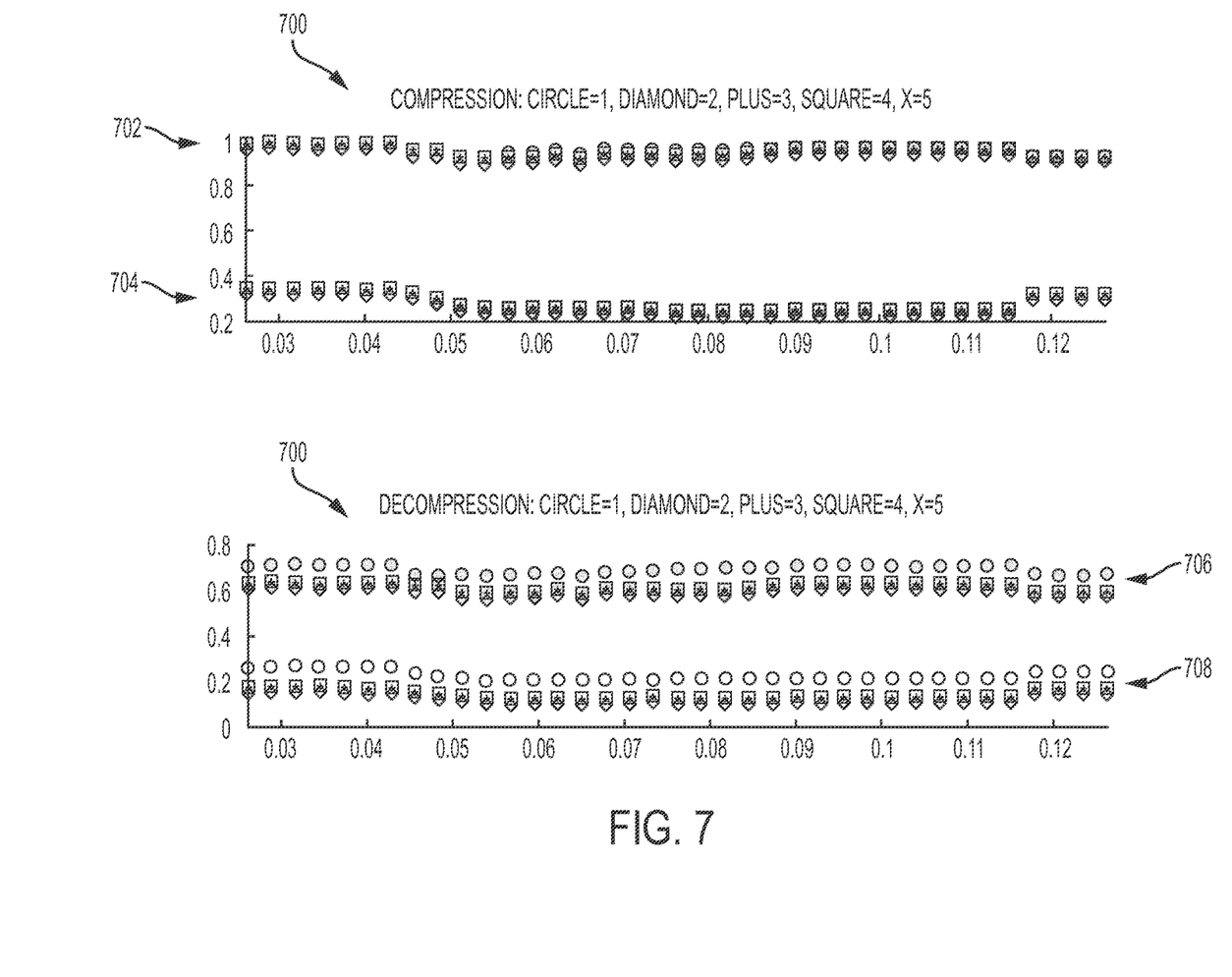
FIG. 7 is a dual plot graph depicting actuation delays of suction valves and discharge valves in chambers of a pressure pump according to one aspect of the present disclosure.

FIGS. 6-7 show the actuation of the suction valves 116 and the discharge valves 118 relative to the plunger position reference points 302, 304, 402, 404. In some aspects, the graphs depicted in FIGS. 6-7 may be displayed on the display unit 214. In FIG. 6, the time distance between the actuation points 502, 504, 506, 508 and the plunger position reference points 302, 304, 402, 404 may represent delays in the actuation (e.g., opening and closing) of the suction valve 116 and the discharge valve 118 for one chamber 106 of the pressure pump 100. FIG. 6 shows the strain signal 500 representing strain measured by the strain gauge 204 for the chamber 106. The actuation points 502, 504, 506, 508 of the suction valve 116 and the discharge valve 118 in the chamber 106 are plotted at the discontinuities in the strain signal 500 as described with respect to FIG. 5. Additionally, the reference points 302, 304, 402, 404 representing the top dead center and bottom dead center of the plunger 114 are plotted. The time between the closing of the suction valve 116 (represented by actuation point 502) and the bottom dead center (represented by reference points 304, 404) may represent a delay in the closing of the suction valve 116. The time between the opening of the discharge valve 118 (represented by actuation point 504) and the bottom dead center (represented by reference points 304, 404) may represent a delay in the opening of the discharge valve 118. Similarly, the time between the closing of the discharge valve 118 (represented by actuation point 504) and the top dead center (represented by reference points 302, 402) may represent a delay in the closing of the discharge valve 118. And, the time between the opening of the suction valve 116 (represented by actuation point 508) and the top dead center (represented by reference points 302, 402) may represent a delay in the opening of the suction valve 116.

In FIG. 7, the actuations of the suction valve 116 and the discharge valve 118 are shown relative to the position of the plunger 114 for each chamber 106 of the pressure pump. The dual graph includes a compression side wherein the actuations of the valves 116, 118 are shown relative to the bottom dead center (represented by reference points 304, 404) of the plungers 114 and a decompression side wherein the actuations of the valves 116, 118 are shown relative to the top dead center (represented by reference points 302, 402) of the plunger 114. Actuation delays 700 are represented by the symbols on the y-axis for the distance of the actuation of each valve 116, 118 from the top dead center or the bottom dead center of the plunger 114 in each chamber. Although FIG. 7 shows the actuation delays 700 in linear distance corresponding to the movement of the plunger 114 in each chamber, the values may be similarly shown in units of degrees of rotation of the crankshaft 108 mechanically coupled to the plungers 114. On the compression side of the dual graph, symbols 702 (the lighter symbols having a higher-trending linear value) may represent the opening of the discharge valve 118 in each chamber 106 and symbols 704 (the darker symbols having a lower-trending linear value) may represent the closing of the suction valve 116 in each chamber 106. On the decompression side of the dual graph, symbols 706 (the lighter symbols having a higher-trending linear value) may represent the opening of the suction valve 116 in each chamber 106 and symbols 708 (the darker symbols having a lower-trending linear value) may represent the closing of the discharge valve 118 in each chamber 106. FIG. 7 shows the valves 116, 118 for multiple chambers 106 of the pressure pump 100. Different symbols may represent each chamber 106 (e.g., valves 116, 118 in a first chamber 106 may be represented by a circle, valves 116, 118 in a second chamber 106 may be represented by a diamond, etc.). Although five chambers 106 are represented, the monitoring system 200 may monitor and determine actuation delays for valves 116, 118 in any number of chambers 106.

To determine critical valve limits for the suction valves 116 and for the discharge valves 118, the processor 208 may execute instruction 216 to compare the actuation delays for similarly operating valves during similar actuations. For example, the processor 208 may determine critical valve limits for discharge valve 118 openings in the pressure pump by comparing the actuation delays 700 for each of the discharge valves 118 as they open (e.g., represented by symbols 702). The processor 208 may similarly determine critical valve limits for discharge valve 118 closings suction valve 116 openings, and suction valve 118 closings by comparing the actuation delays 700 for the corresponding valve actuations (e.g., symbols 708, 706, 704, respectively). In some aspects, the critical valve limits for a valve actuation each include the range of the majority of the actuation delays 700 corresponding to the valve actuation. The critical valve limits may represent the expected operation of the valves.

If actuation delays 700 are determined to fall outside of the critical valve limit for the corresponding valve actuation, the processor 208 may identify the valve 116, 118 corresponding to the actuation delay valve as an outlier valve. The deviation of the outlier valve may be identified in terms of having a statistical variation from the normal operation as determined by the critical valve limit. For example, FIG. 7 indicates deviations on the decompression side with respect to the suction valve 116 and discharge valve 118 for the first chamber 106 (represented by the circle symbols). As shown in FIG. 7, the actuation delays 700 correspond to the suction valve 116 openings (e.g., symbols 706) and the discharge valve 118 closings (e.g., symbols 708). The remaining actuation delays in symbols 706, 708 are consistent, identifying valves 116, 118 for the first chamber 106 as outlier valves. The outlier valves may indicate a condition or issue within the first chamber 106 of the pressure pump 100. For example, the deviations of the actuation delays 700 for the first chamber 106 may indicate a leak in the suction valve 116 or discharge valve 118 for the first chamber 106.

Figure 8:
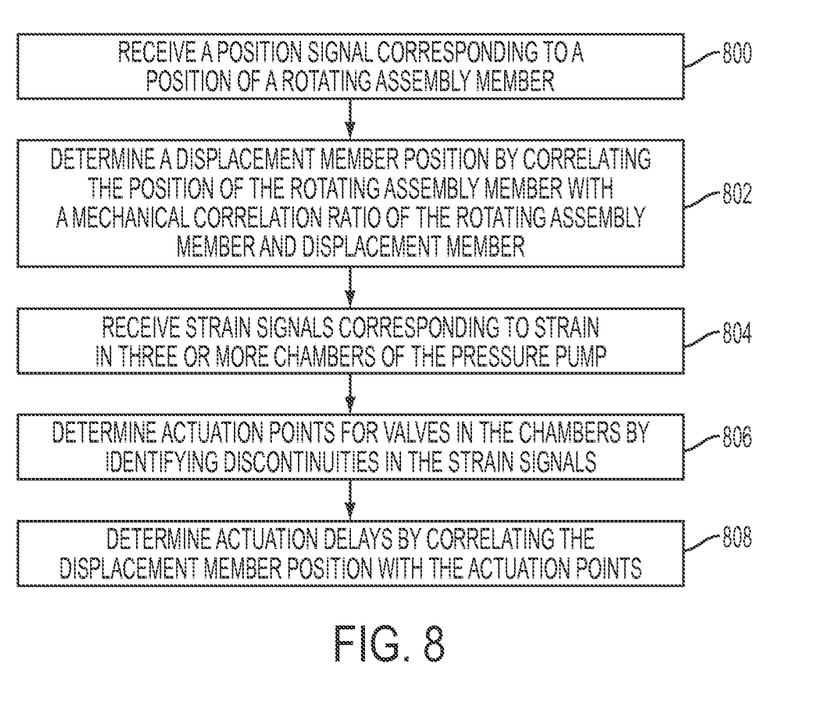
FIG. 8 is a flowchart describing a process for monitoring valves in a pressure pump according to one aspect of the present disclosure.

FIG. 8 is a flowchart showing a process for monitoring the valves 116, 118 of the pressure pump 100 to determine critical valve limits. The process is described with respect to the monitoring system 200 shown in FIG. 2, although other implementations are possible without departing from the scope of the present disclosure.

In block 800, the computing device 206 may receive a position signal 300, 400 from the position sensor 202. In some aspects, the received signal may be similar to position signal 300 and may be received from the position sensor 202 sensing the position of a member of the rotating assembly (e.g., the crankshaft) 108 from a position proximate to the path of the rotating assembly as described with respect to FIG. 3. In other aspects, the received signal may be similar to position signal 400 and may be received from the position sensor 202 sensing the position of the crankshaft 108 from being positioned on a crankcase of the crankshaft 108 as described with respect to FIG. 4.

In block 802, the computing device 206 may determine the position of displacement members (e.g., the plungers 114) for each chamber 106 based on the position signal 300, 400. In some aspects, the plungers 114 may be mechanically coupled to the crankshaft 108 in a manner that the movement or position of the plungers 114 in each chamber 106 is directly related to the movement or position of the crankshaft 108 and in a manner that the plungers 114 operate in concert in their respective chambers 106. Based on the mechanical coupling of the crankshaft 108 and the plungers 114, the computing device 206 may determine plunger position reference points 302, 304, 402, 404 corresponding to the position of the plungers 114 at various times during operation of the crankshaft 108 or pressure pump 100. For example, the computing device 206 may determine reference points 302, 304 representing the top dead center and bottom dead center positions of the plungers 114, respectively.

In block 804, the processor 208 may receive a strain signal 500 from the strain gauges 204 for each of the chambers 106. In some aspects, the monitoring system 200 may include at least three strain gauges 204. The strain gauges 204 may be positioned on the fluid end 104 of the pressure pump 100 and generate a strain signal 500 corresponding to strain in each chamber 106 of the pressure pump 100. The strain signal 500 may represent a characterization of the strain in a chamber 106 as the suction valve 116 and the discharge valve 118 for each chamber 106 actuate (e.g., open or close) in response to the operation of the plunger 114 in the chambers 106.

In block 806, the computing device 206 may determine the actuation points 502, 504, 506, 508 for the suction valve 116 and the discharge valve 118 in each chamber 106 of the pressure pump 100. In some aspects, the computing device 206 may determine actuation points 502, 504, 506, 508 based on the discontinuities in the strain signal 500 for each chamber 106 as described with respect to FIG. 5. The actuation points 502, 508 may represent the closing and opening of the suction valves 116, respectively. The actuation points, 504, 506 may represent the opening and closing of the discharge valves 118, respectively.

In block 808, the computing device 206 may determine actuation delays for the suction valve 116 or the discharge valve 118 in each chamber 106 based on the position of the respective plunger 114 and the respective actuation points 502, 504, 506, 508 of the valves 116, 118 for each chamber 106. The computing device 206 may correlate the reference points 302/402, 304/404 corresponding to the position of the plunger 114 (or other displacement member) and derived from the position signal 300/400 with the actuation points 502, 504, 506, 508 corresponding to the actuation of the suction valve 116 and discharge valve 118 for each chamber 106. The time or distance between the reference point 302/304 or the reference point 304/404 of the position of the plunger 114 and the actuation points 502, 504, 506, 508 may represent actuation delays corresponding to the opening and closing of the suction valve 116 and the discharge valve 118.

In some aspects, the actuation delays 700 may be compared to valves of a same type or operation for a same actuation (e.g., a comparison between suction valves 116 opening to allow fluid in a chamber 106, a comparison between discharge valves 118 to allow fluid to be discharged from a chamber 106) in the other chambers of the pressure pump to determine a critical valve limit for the valve type (e.g., suction valves 116, discharge valves 118). Based on the comparison, the computing device 206 may determine an outlier valve falling outside of the critical valve limit. The outlier valve may indicate a condition or issue in the chamber of the valve or a condition of the valve itself In additional or alternative aspects, the computing device 206 may store the critical valve limits for each valve type in the memory 212 as pump data 220. The computing device 206 may use the pump data 220 for real-time self-calibration of the pressure pump 100 under a particular set of conditions. In some aspects, the self-calibration may allow the computing device 206 to indicate a condition in more than one chamber 106. In additional aspects, the self-calibration may also allow the computing device 206 to perform additional monitoring of the valves 116, 118 by comparing the real-time monitoring data to the pump data 220 stored in the memory 212.

In some aspects, pump monitoring systems are provided according to one or more of the following examples:

Example #1

A monitoring system for use in a pump having multiple chambers may comprise a position sensor positionable on a power end of the pump to sense a position of a member of a rotating assembly of the pump and generate a position signal representing the position of the member during operation of the pump. The position signal may be usable in determining a position of a displacement member in each of three or more chambers in a fluid end of the pump. The monitoring system may also comprise three or more strain gauges positionable on the three or more chambers to measure strain in the three or more chambers and generate corresponding strain signals representing the strain in each of the three or more chambers. The corresponding strain signals may be usable in determining actuation points for corresponding valves in each of the three or more chambers. The monitoring system may also comprise a computing device couplable to the position sensor and the three or more strain gauges. The computing device may include a processing device for which instructions executable by the processing device are used to cause the processing device to determine actuation delays of each of the corresponding valves by correlating the position of the displacement member in each of the three or more chambers with the actuation points for the corresponding valves. The actuation delays may represent the actuation points relative to the position of the displacement member during operation of the pump and being usable in determining a critical valve limit for the corresponding valves.

Example #2

The monitoring system of Example #1 may feature the three or more strain gauges being positionable on an external surface of the fluid end of the pump. The three or more strain gauges may include at least a first strain gauge positionable on the fluid end to measure the strain in a first chamber of the three or more chambers, a second strain gauge positionable on the fluid end to measure the strain in a second chamber of the three or more chambers, and a third strain gauge positionable on the fluid end to measure the strain in a third chamber of the three or more chambers.

Example #3

The monitoring system of Examples #1-2 may feature the position sensor being positionable proximate to a path of the rotating assembly to determine the position of the member.

Example #4

The monitoring system of Examples #1-3 may feature the position sensor being positionable on a crankcase to determine a bolt pattern representing the position of the member.

Example #5

The monitoring system of Examples #1-4 may feature the actuation points including points corresponding to an opening or a closing of each of the corresponding valves. The computing device may comprise a memory device including instructions executable by the processing device for causing the processing device to determine the actuation points based on discontinuities each of the corresponding strain signals.

Example #6

The monitoring system of Examples #1-5 may feature a memory device comprising instructions executable by the processing device for causing the processing device to determine the position of the displacement member for each of the three or more chambers by correlating the position of the member of the rotating assembly with a ratio representing a mechanical correlation of the member to the displacement member in each of the three or more chambers.

Example #7

The monitoring system of Examples #1-6 may feature a memory device comprising instructions executable by the processing device for causing the processing device to determine the critical valve limit by comparing the actuation delays for each of the corresponding valves and identifying a range representing a majority of the actuation delays.

Example #8

The monitoring system of Examples #1-7 may feature a memory device comprising instructions executable by the processing device for causing the processing device to determine an outlier valve of the corresponding valves by identifying at least one of the corresponding valves having an actuation delay outside of the range, the outlier valve representing a condition of one of the three or more chambers corresponding to the at least one of the corresponding valves.

Example #9

The monitoring system of Examples #1-8 may also include a display unit couplable to the computing device. A memory device may comprise instructions executable by the processing device for causing the processing device to generate a graphical representation of the actuation delays for each of the corresponding valves.

Example #10

A pumping system may comprise a pump having a fluid end and a power end. The fluid end of the pump may include three or more chambers. Each of the three or more chambers may have corresponding valves actuatable at corresponding actuation points that are measurable by corresponding strain gauges for each of the three or more chambers. Each of the three or more chambers may further have corresponding plungers. Each of the corresponding plungers may be mechanically coupled to a crankshaft in the power end of the pump and actuatable between a first reference point and a second reference point through a plunger transition between the first reference point and the second reference point that is measurable by a position sensor. The pumping system may also comprise a computing device couplable to the pump. The computing device may include a processing device for which instructions executable by the processing device may be used to cause the processing device to determine actuation delays of each of the corresponding valves by correlating the position of the corresponding plungers with the corresponding actuation points. The actuation delays may represent the corresponding actuation points relative to the position of the corresponding plungers during operation of the pump and being useable in determining a critical value limit for the corresponding valves.

Example #11

The pumping system of Example #10 may feature the corresponding strain gauges positionable on an external surface of the fluid end of the pump to measure strain in the three or more chambers. The corresponding strain gauges may include at least a first strain gauge positionable on the fluid end to measure the strain in a first chamber of the three or more chambers and generate a first strain signal representing the strain in the first chamber, a second strain gauge positionable on the fluid end to measure the strain in a second chamber of the three or more chambers and generate a second strain signal representing the strain in the second chamber, and a third strain gauge positionable on the fluid end to measure the strain in a third chamber of the three or more chambers and generate a third strain signal representing the strain in the third chamber. The computing device may comprise a memory device including instructions executable by the processing device for causing the processing device to determine the corresponding actuation points for each of the corresponding valves by identifying discontinuities in the first strain signal, the second strain signal, and the third strain signal.

Example #12

The pumping system of Examples #10-11 may feature the position sensor being couplable to the pump and the computing device. The position sensor may be positionable on an external surface of the power end of the pump to sense a position of the crankshaft and generate a position signal corresponding to the position of the crankshaft.

Example #13

The pumping system of Examples# 10-12 may feature the first reference point corresponding to a first plunger position and the second reference point corresponding to a second plunger position. A distance between the first plunger position and the second plunger position may represent a full stroke length of the corresponding plungers for each of the three or more chambers. A memory device may comprise instructions executable by the processing device for causing the processing device to determine the first reference point and the second reference point of the corresponding plungers by correlating a position signal received from the position sensor and representing a position of the crankshaft with a ratio representing a mechanical correlation of the corresponding plungers to the crankshaft.

Example #14

The pumping system of Examples #10-13 may feature a memory device comprising instructions executable by the processing device for causing the processing device to determine the critical valve limit by comparing the actuation delays for each of the corresponding valves and identifying a range representing a majority of the actuation delays.

Example #15

The pumping system of Examples #10-14 may feature a memory device comprising instructions executable by the processing device for causing the processing device to determine an outlier valve of the corresponding valves by identifying at least one of the corresponding valves having an actuation delay outside of the range. The outlier valve may represent a condition of one of the three or more chambers corresponding to the at least one of the corresponding valves.

Example #16

The pumping system of Examples #10-14 may feature a memory device comprising pump data corresponding to a stored range representing the majority of the actuation delays previously identified by the processing device. A memory device may comprise instructions executable by the processing device for causing the processing device to determine an outlier valve of the corresponding valves by identifying at least one of the corresponding valves having an actuation delay outside of the stored range. The outlier valve may represent a condition of one of the three or more chambers corresponding to the at least one of the corresponding valves.

Example #17

The pumping system of Examples #10-17 may also comprise a display unit couplable to the computing device. A memory device may comprise instructions executable by the processing device for causing the processing device to generate a graphical representation of the actuation delays for each of the corresponding valves.

Example #18

A method for monitoring valves in a pump may comprise receiving, from a position sensor coupled to a power end of the pump, a position signal representing a position of a crankshaft of the pump. The method may also comprise determining, by a computing device, a position of corresponding displacement members operable in each of three or more chambers by correlating the position of the member of the rotating assembly with a ratio representing a mechanical correlation of the member to the corresponding displacement members. The method may also comprise receiving, from each of three or more stain gauge coupled to an external surface of a fluid end of the pump, strain signals representing strain in each of the three or more chambers. The method may also comprise determining, by the computing device, actuation points corresponding to an opening or a closing of the valves in each of the three or more chambers by identifying discontinuities in the strain signals; and determining, by the computing device, actuation delays for each of the valves by correlating the position of the corresponding displacement members in each of the three or more chambers with the actuation points.

Example #19

The method of Example #18 may also comprise determining critical valve limits for the valves by comparing the actuation delays for each of the valves and identifying a range representing a majority of the actuation delays. The method may also comprise determining an outlier valve of the valves by identifying at least one of the valves representing an actuation delay outside of the range, the outlier valve representing a condition of one of the three or more chambers corresponding to the at least one of the valves.

Example #20

The method of Examples #18-19 may feature the valves including three or more valves corresponding to the three or more chambers. Each of the three or more valves may perform a same operation in the three or more chambers. The actuation delays may represent a same actuation type.

The foregoing description of the examples, including illustrated examples, has been presented only for the purpose of illustration and description and is not intended to be exhaustive or to limit the subject matter to the precise forms disclosed. Numerous modifications, combinations, adaptations, uses, and installations thereof can be apparent to those skilled in the art without departing from the scope of this disclosure. The illustrative examples described above are given to introduce the reader to the general subject matter discussed here and are not intended to limit the scope of the disclosed concepts.

What is claimed is:

1. A monitoring system for use in a pump having multiple chambers, comprising:
   a position sensor positionable on a power end of the pump to sense a position of a member of a rotating assembly of the pump and generate a position signal representing the position of the member during operation of the pump, the position signal being usable in determining a position of a displacement member in each of three or more chambers in a fluid end of the pump;
   three or more strain gauges positionable on the three or more chambers to measure strain in the three or more chambers and generate corresponding strain signals representing the strain in each of the three or more chambers, the corresponding strain signals being usable in determining actuation points for corresponding valves in each of the three or more chambers; and a computing device couplable to the position sensor and the three or more strain gauges, the computing device including a processing device for which instructions executable by the processing device are used to cause the processing device to determine actuation delays of each of the corresponding valves by correlating the position of the displacement member in each of the three or more chambers with the actuation points for the corresponding valves, the actuation delays representing the actuation points relative to the position of the displacement member during operation of the pump and being usable in determining a critical valve limit for the corresponding valves.

2. The monitoring system of claim 1, wherein the three or more strain gauges are positionable on an external surface of the fluid end of the pump, and wherein the three or more strain gauges includes at least a first strain gauge positionable on the fluid end to measure the strain in a first chamber of the three or more chambers, a second strain gauge positionable on the fluid end to measure the strain in a second chamber of the three or more chambers, and a third strain gauge positionable on the fluid end to measure the strain in a third chamber of the three or more chambers.

3. The monitoring system of claim 1, wherein the position sensor is positionable proximate to a path of the rotating assembly to determine the position of the member.

4. The monitoring system of claim 1, wherein the position sensor is positionable on a crankcase of a crankshaft of the rotating assembly to determine a bolt pattern representing the position of the member.

5. The monitoring system of claim 1, wherein the actuation points include points corresponding to an opening or a closing of each of the corresponding valves, and wherein the computing device comprises a memory device including instructions executable by the processing device for causing the processing device to determine the actuation points based on discontinuities each of the corresponding strain signals.

6. The monitoring system of claim 1, wherein the computing device comprises a memory device including instructions executable by the processing device for causing the processing device to determine the position of the displacement member for each of the three or more chambers by correlating the position of the member with a ratio representing a mechanical correlation of the member to the displacement member in each of the three or more chambers.

7. The monitoring system of claim 1, wherein the computing device comprises a memory device including instructions executable by the processing device for causing the processing device to determine the critical valve limit by comparing the actuation delays for each of the corresponding valves and identifying a range representing a majority of the actuation delays.

8. The monitoring system of claim 7, wherein the memory device includes instructions executable by the processing device for causing the processing device to determine an outlier valve of the corresponding valves by identifying at least one of the corresponding valves having an actuation delay outside of the range, the outlier valve representing a condition of one of the three or more chambers corresponding to the at least one of the corresponding valves.

9. The monitoring system of claim 1, further comprising a display unit and a memory device couplable to the computing device, wherein the memory device comprises instructions executable by the processing device for causing the processing device to generate a representation of the actuation delays for each of the corresponding valves.

10. A pumping system, comprising:
a pump including a fluid end and a power end, the fluid end of the pump including three or more chambers, each of the three or more chambers having corresponding valves actuatable at corresponding actuation points that are measurable by corresponding strain gauges for each of the three or more chambers, each of the three or more chambers further having corresponding plungers, each of the corresponding plungers being mechanically coupled to a crankshaft in the power end of the pump and actuatable between a first reference point and a second reference point through a plunger transition between the first reference point and the second reference point that is measurable by a position sensor; and a computing device couplable to the pump, the computing device including a processing device for which instructions executable by the processing device are used to cause the processing device to determine actuation delays of each of the corresponding valves by correlating the position of the corresponding plungers with the corresponding actuation points, the actuation delays representing the corresponding actuation points relative to the position of the corresponding plungers during operation of the pump and being useable in determining a critical value limit for the corresponding valves.

11. The pumping system of claim 10, wherein the corresponding strain gauges are positionable on an external surface of the fluid end of the pump to measure strain in the three or more chambers, wherein the corresponding strain gauges include at least a first strain gauge positionable on the fluid end to measure the strain in a first chamber of the three or more chambers and generate a first strain signal representing the strain in the first chamber, a second strain gauge positionable on the fluid end to measure the strain in a second chamber of the three or more chambers and generate a second strain signal representing the strain in the second chamber, and a third strain gauge positionable on the fluid end to measure the strain in a third chamber of the three or more chambers and generate a third strain signal representing the strain in the third chamber, and wherein the computing device comprises a memory device including instructions executable by the processing device for causing the processing device to determine the corresponding actuation points for each of the corresponding valves by identifying discontinuities in the first strain signal, the second strain signal, and the third strain signal.

12. The pumping system of claim 10, wherein the position sensor is positionable on an external surface of the power end of the pump to sense a position of the crankshaft and generate a position signal corresponding to the position of the crankshaft.

13. The pumping system of claim 10, wherein the first reference point corresponds to a first plunger position and the second reference point corresponds to a second plunger position, a distance between the first plunger position and the second plunger position representing a full stroke length of the corresponding plungers for each of the three or more chambers, and wherein the computing device comprises a memory device including instructions executable by the processing device for causing the processing device to determine the first reference point and the second reference point of the corresponding plungers by correlating a position signal received from the position sensor and representing a position of the crankshaft with a ratio representing a mechanical correlation of the corresponding plungers to the crankshaft.

14. The pumping system of claim 10, wherein the computing device comprises a memory device including instructions executable by the processing device for causing the processing device to determine the critical valve limit by comparing the actuation delays for each of the corresponding valves and identifying a range representing a majority of the actuation delays.

15. The pumping system of claim 14, wherein the memory device includes instructions executable by the processing device for causing the processing device to determine an outlier valve of the corresponding valves by identifying at least one of the corresponding valves having an actuation delay outside of the range, the outlier valve representing a condition of one of the three or more chambers corresponding to the at least one of the corresponding valves.

16. The pumping system of claim 14, wherein the memory device includes pump data corresponding to a stored range representing the majority of the actuation delays previously identified by the processing device, and wherein the memory device comprises instructions executable by the processing device for causing the processing device to determine an outlier valve of the corresponding valves by identifying at least one of the corresponding valves having an actuation delay outside of the stored range, the outlier valve representing a condition of one of the three or more chambers corresponding to the at least one of the corresponding valves.

17. The pumping system of claim 10, further comprising a display unit and a memory device couplable to the computing device, wherein the memory device comprises instructions executable by the processing device for causing the processing device to generate a representation of the actuation delays for each of the corresponding valves.

18. A method for monitoring valves in a pump, comprising:
receiving, from a position sensor coupled to a power end of the pump, a position signal representing a position of a member of a rotating assembly of the pump;
determining, by a computing device, a position of corresponding displacement members operable in each of three or more chambers by correlating the position of the member of the rotating assembly with a ratio representing a mechanical correlation of the member to the corresponding displacement members;
receiving, from each of three or more stain gauge coupled to an external surface of a fluid end of the pump, strain signals representing strain in each of the three or more chambers;
determining, by the computing device, actuation points corresponding to an opening or a closing of the valves in each of the three or more chambers by identifying discontinuities in the strain signals; and
determining, by the computing device, actuation delays for each of the valves by correlating the position of the corresponding displacement members in each of the three or more chambers with the actuation points.

19. The method of claim 18, further comprising:
determining critical valve limits for the valves by comparing the actuation delays for each of the valves and identifying a range representing a majority of the actuation delays; and
determining an outlier valve of the valves by identifying at least one of the valves representing an actuation delay outside of the range, the outlier valve representing a condition of one of the three or more chambers corresponding to the at least one of the valves.

20. The method of claim 19, wherein the valves include three or more valves corresponding to the three or more chambers, each of the three or more valves performing a same operation in the three or more chambers, and wherein the actuation delays represent a same actuation type.

* * * * *